US008253981B2

(12) United States Patent
Eguchi

(10) Patent No.: US 8,253,981 B2
(45) Date of Patent: Aug. 28, 2012

(54) FORMATION OF A COLOR IMAGE BY USING A PLURALITY OF COLOR COMPONENT MATERIALS

(75) Inventor: Kimimori Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 828 days.

(21) Appl. No.: 11/948,682

(22) Filed: Nov. 30, 2007

(65) Prior Publication Data

US 2008/0259366 A1    Oct. 23, 2008

(30) Foreign Application Priority Data

Dec. 4, 2006  (JP) .................................. 2006-327628

(51) Int. Cl.
 *H04N 1/405* (2006.01)
(52) U.S. Cl. .......... 358/3.1; 358/3.21; 358/518; 358/1.9
(58) Field of Classification Search .................... 358/1.9, 358/3.21, 518, 3.1
See application file for complete search history.

(56) References Cited

U.S. PATENT DOCUMENTS

| | | | |
|---|---|---|---|
| 5,726,779 A * | 3/1998 | Kadowaki et al. ............ | 358/520 |
| 6,549,303 B1 | 4/2003 | Trask .............................. | 358/1.9 |
| 6,654,145 B1 * | 11/2003 | Speck ............................ | 358/1.9 |
| 6,795,214 B2 * | 9/2004 | Weinholz et al. ............. | 358/1.9 |
| 7,146,043 B2 * | 12/2006 | McElvain ...................... | 382/167 |
| 2005/0219631 A1 * | 10/2005 | Accad et al. .................. | 358/3.26 |

* cited by examiner

*Primary Examiner* — King Poon
*Assistant Examiner* — Jamares Q Washington
(74) *Attorney, Agent, or Firm* — Fitzpatrick, Cella, Harper & Scinto

(57) ABSTRACT

A reference area around a pixel of interest is set in an image to be processed. It is determined whether a pixel not to be referred exists in the reference area. If the pixel not to be referred exists, the shape of the reference area is transformed based on the pixel. A trapping color for the pixel of interest is decided based on, a first peripheral pixel having a color component that is not included in the pixel of interest among peripheral pixels around the pixel of interest included in the reference area with the transformed shape. The density of the trapping color is calculated based on the peripheral pixels. The pixel value of the pixel of interest is corrected using the pixel of the trapping color having the calculated density in the image to be processed. The image forming unit forms an image having pixels corrected by said correction unit.

20 Claims, 12 Drawing Sheets

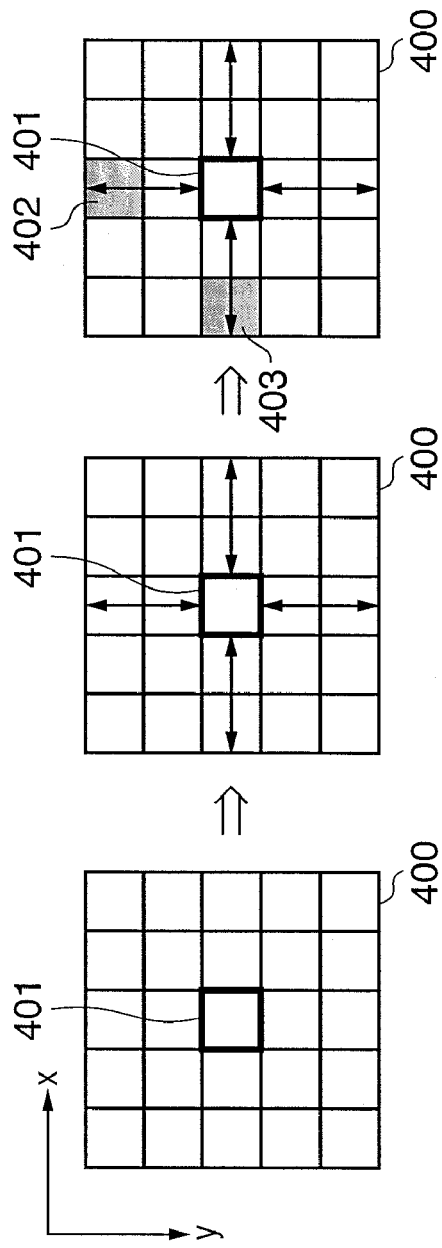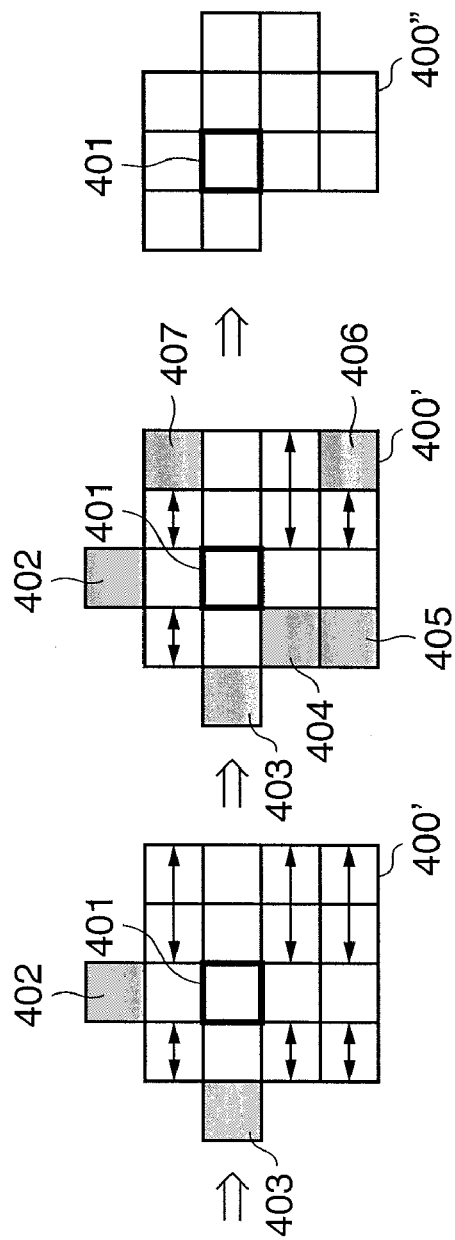

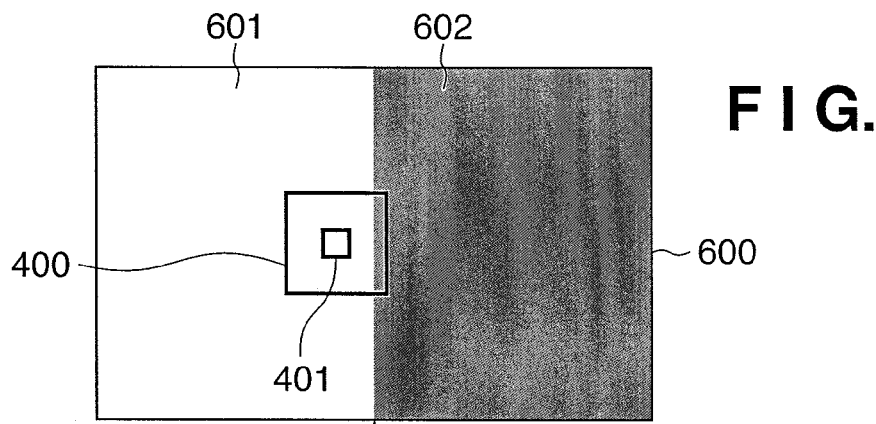
FIG. 6A
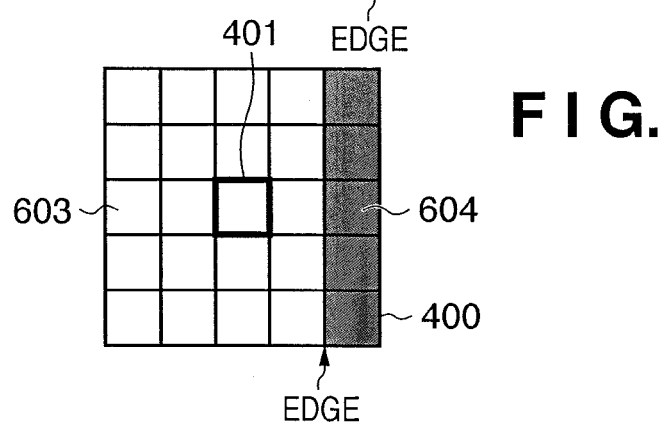
FIG. 6B
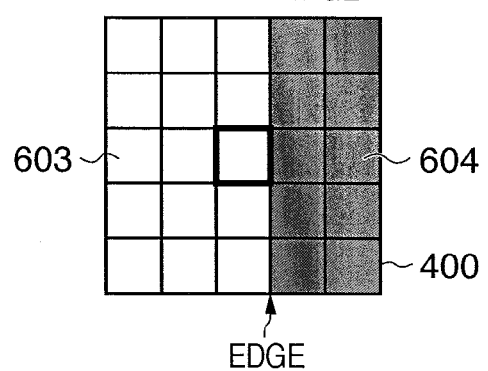
FIG. 6C
FIG. 6D
FIG. 6E
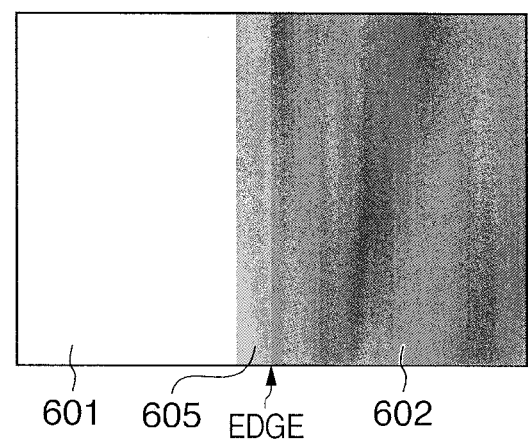
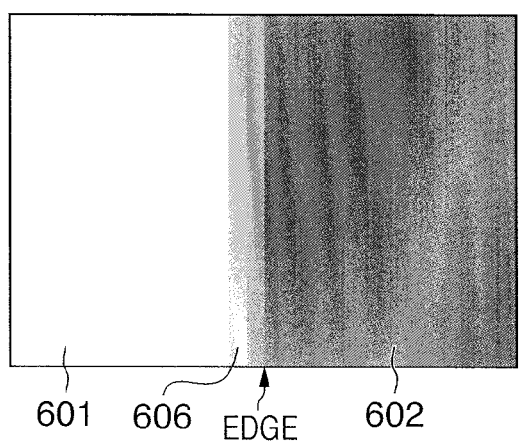

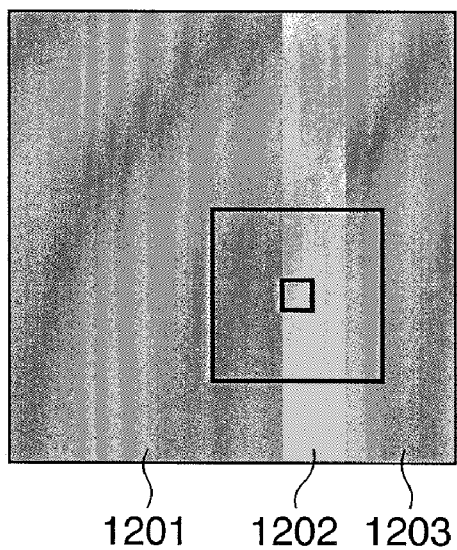 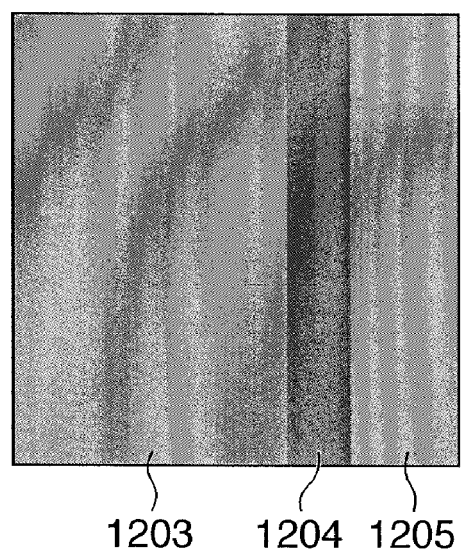
1201  1202 1203
FIG. 12A
1203  1204 1205
FIG. 12B

FORMATION OF A COLOR IMAGE BY USING A PLURALITY OF COLOR COMPONENT MATERIALS

BACKGROUND OF THE INVENTION

1. Field of the Invention

The present invention relates to an image forming apparatus, a control method of an image forming apparatus, and a computer program.

2. Description of the Related Art

In trapping raster data, conventionally, a method described in U.S. Pat. No. 6,549,303 can be used to trap a pixel of interest using peripheral pixels (reference area) around it.

In this method, for example, the reference area of an original image is segmented into an area (area A) containing a pixel of interest and another area (area B), and the representative pixels of the two areas are compared, thereby generating a trapping color, as shown in FIG. 9. A trapping color indicates color data to be used for trapping for an unprinted portion generated by misregistration.

For example, if a light color similar to white is present between objects, as indicated by 1001 in FIG. 10, and the objects are apart from each other inherently, trapping should not be executed for a pixel of interest belonging to that portion. In the above-described method, however, trapping is executed by comparing the representative point of the area A with that of an area C. Hence, trapping may be executed for an undesirable part (area which includes a light color similar to white and should not be subjected to trapping).

Additionally, if a large trap width is set, the trap width becomes very large relative to the point width of a character, and the appearance becomes poor. For example, assume an image shown in FIG. 11A. When a character "W" 1101 is placed on a light gray background 1102 and printed using a large trap width, the appearance of the print result is poor, as shown in FIG. 11B. FIG. 11C shows a preferable trapping result.

Assume that a reference area includes a plurality of trapping color candidates. FIG. 12A shows a reference area including three color areas: magenta (M) area 1201, cyan (C) area 1202, and yellow (Y) area 1203. If the plurality of trapping colors are simply combined, the density of pixels rises, and a color such as brown or black that is widely separate from the pixel color of the original document is obtained. For example, when the trapping color M or Y is added to the C area 1202, the color changes to brown or black, like an area 1204 shown in FIG. 12B.

In the above-described technique, how to decide the representative pixel of each of the plurality of areas generated by segmenting the reference area is not examined. The criterion to be used for trapping when the reference area is segmented into a plurality of areas is still a matter for examination. Furthermore, in general trapping, there is a fear of degradation in image quality of a certain kind of object such as a gradation object.

It is difficult to execute a trapping process based on effective reference area setting without degrading the image quality of a printed product.

SUMMARY OF THE INVENTION

It is an object of the present invention to enable a trapping process based on effective reference area setting without degrading the image quality of a printed product.

An invention corresponding to one aspect of the present invention relates to an image forming apparatus comprising an area setting unit configured to set a reference area around a pixel of interest in an image to be processed, a determination unit configured to determine whether a pixel not to be referred exists in the reference area, a transformation unit configured to, if the pixel not to be referred exists, transform the shape of the reference area based on the pixel, a decision unit configured to decide a trapping color for the pixel of interest based on, a first peripheral pixel having a color component that is not included in the pixel of interest among peripheral pixels around the pixel of interest included in the reference area with the transformed shape, a density calculation unit configured to calculate a density of the trapping color based on the peripheral pixels, a correction unit configured to correct a pixel value of the pixel of interest using the trapping color having the calculated density in the image to be processed, and an image forming unit configured to form an image having pixels corrected by the correction unit.

Further features of the present invention will become apparent from the following description of exemplary embodiments with reference to the attached drawings.

BRIEF DESCRIPTION OF THE DRAWINGS

FIGS. 4A to 4F are views for explaining a process of transforming the shape of the reference area 400 according to the embodiment of the present invention;

FIGS. 6A to 6E are views for explaining a trapping color calculation process according to the first embodiment of the present invention;

FIGS. 12A and 12B are views for explaining another problem of the conventional trapping process.

DESCRIPTION OF THE EMBODIMENTS

A trapping process by an image forming apparatus according to an embodiment of the present invention will be described below in detail with reference to the accompanying drawings.

First Embodiment

Figure 1:
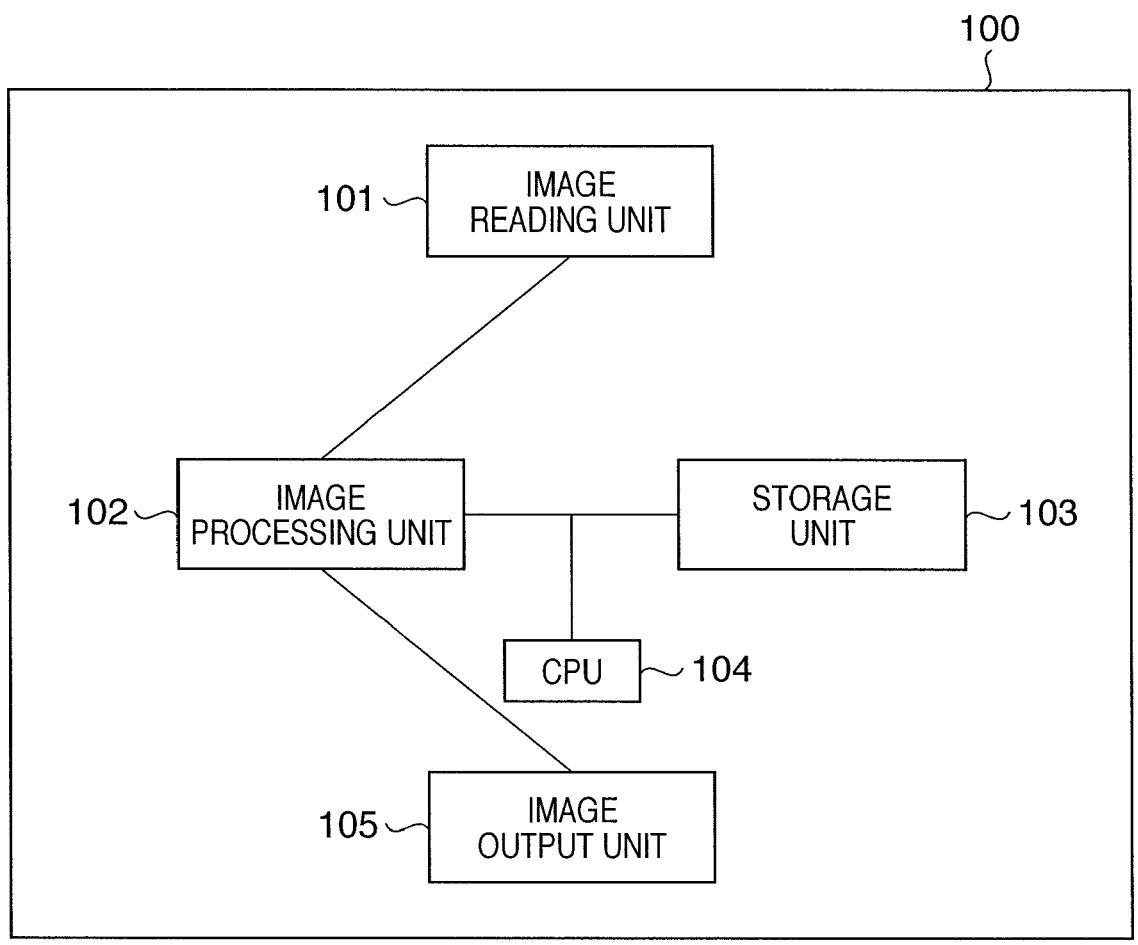
FIG. 1 is a block diagram showing the schematic arrangement of an image forming apparatus 100 according to an embodiment of the present invention.

FIG. 1 is a block diagram showing the schematic arrangement of an image forming apparatus 100 according to the first embodiment of the present invention. This embodiment will be explained assuming, for example, a digital multifunctional peripheral as the image forming apparatus 100. The present embodiment is applicable not only to the multifunctional peripheral but also to any other printing devices including color printers such as a laser beam printer and inkjet printer.

The structure of the image forming apparatus 100 according to this embodiment will be described. As shown in FIG. 1, the image forming apparatus 100 includes an image reading unit 101, image processing unit 102, storage unit 103, CPU 104, and image output unit 105. The image forming apparatus can be connected, via a network such as a LAN or Internet, to a server for managing image data or a personal computer (PC) for instructing the image forming apparatus to execute printing.

The functions of the units of the image forming apparatus shown in FIG. 1 will be described. The image reading unit 101 reads an input image. For example, the image reading unit 101 reads a CMYK color image. Next, the image processing unit 102 converts received print information into intermediate information (to be referred to as an "object" hereinafter) and stores it in an object buffer in itself. At this time, the image processing unit 102 performs image processing such as density correction. The image processing unit 102 also generates bitmap data of the buffered object and stores it in an internal band buffer. At this time, the image processing unit 102 performs, for example, a dither process and halftone process.

As described above, a trapping process is executed in an object database in a RIP or for bitmap data after rendering. The present embodiment mainly assumes the trapping process for bitmap data is performed after rendering.

The arrangements and functions of the storage unit 103, CPU 104, and image output unit 105 of the image forming apparatus shown in FIG. 1 will be described next. The storage unit 103 includes various kinds of storage media such as a random access memory (RAM) and read only memory (ROM). For example, the RAM is used as a reference area to store data and various kinds of information or a work reference area. The ROM is used as a reference area to store various kinds of control programs. The CPU 104 is used to determine and control various kinds of processes in accordance with the programs stored in the ROM. The image output unit 105 outputs an image (e.g., forms an image on a printing medium such as a printing paper sheet and outputs it).

Figure 8:
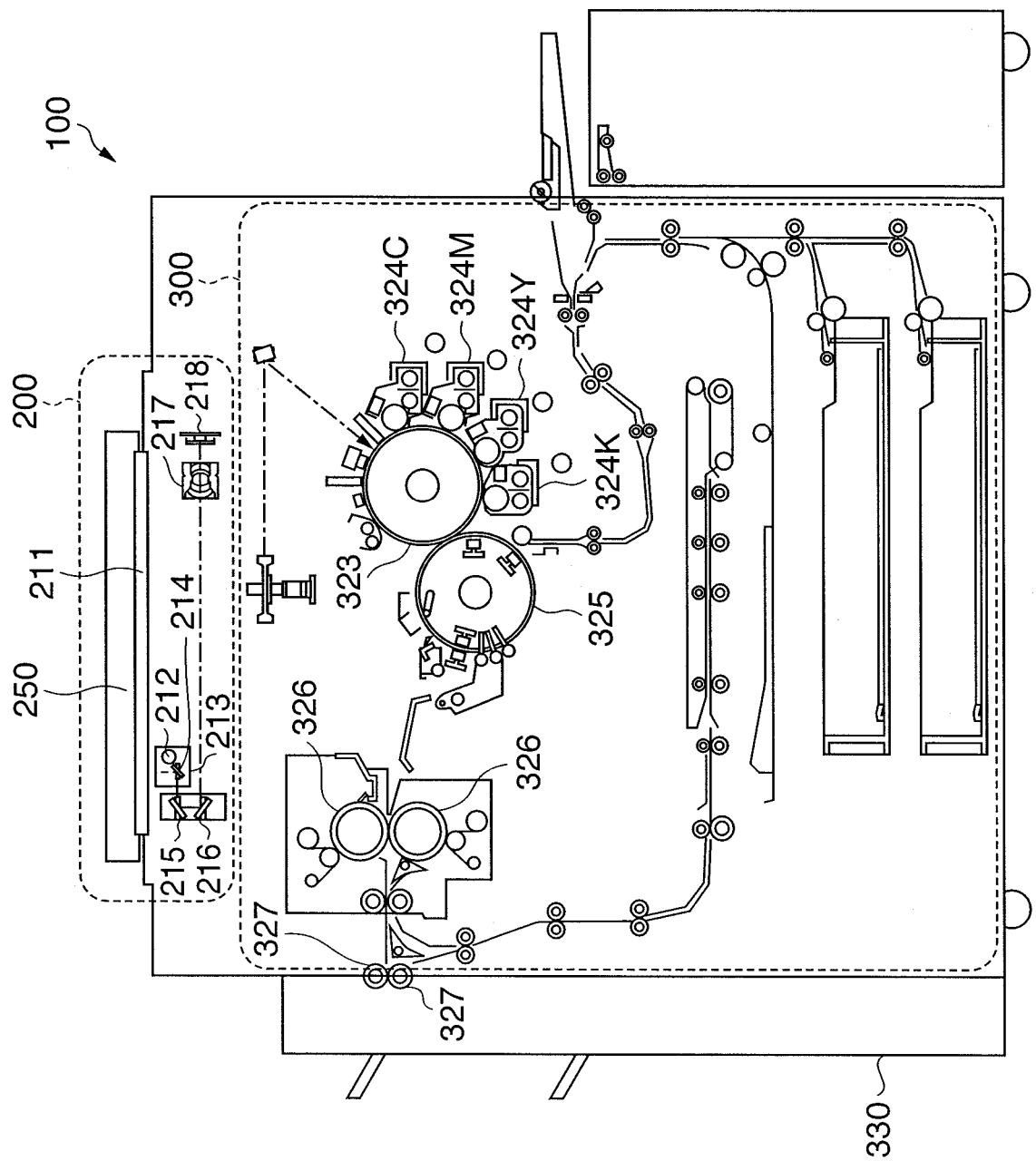
FIG. 8 is a view showing an example of the hardware configuration of the image forming apparatus 100 according to the embodiment of the present invention.
Figure 9:
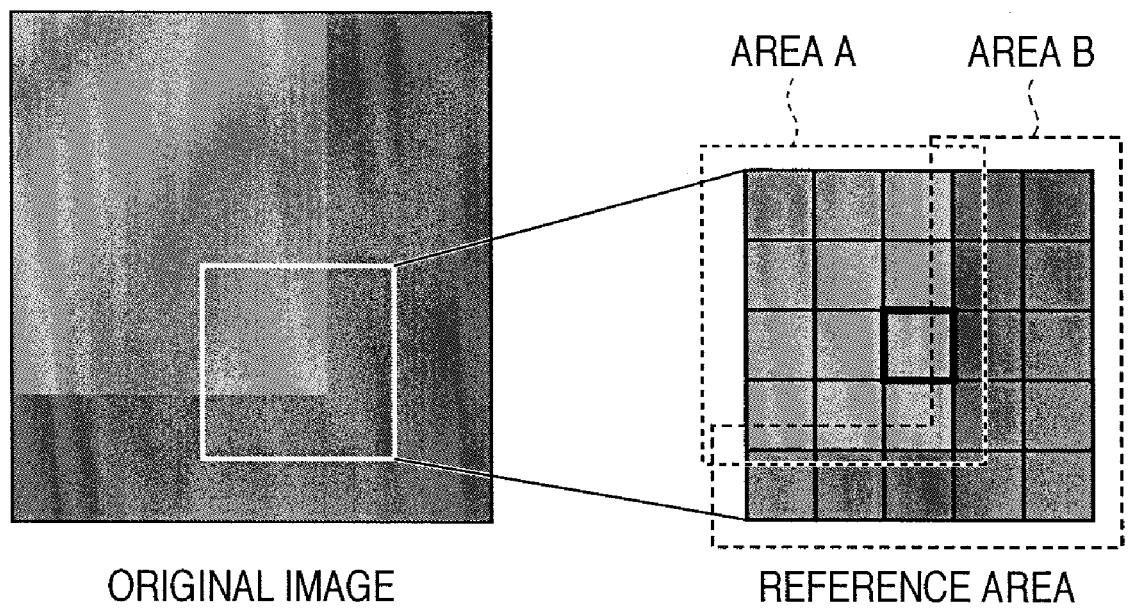
FIG. 9 is a view for explaining a trapping process.
Figure 10:
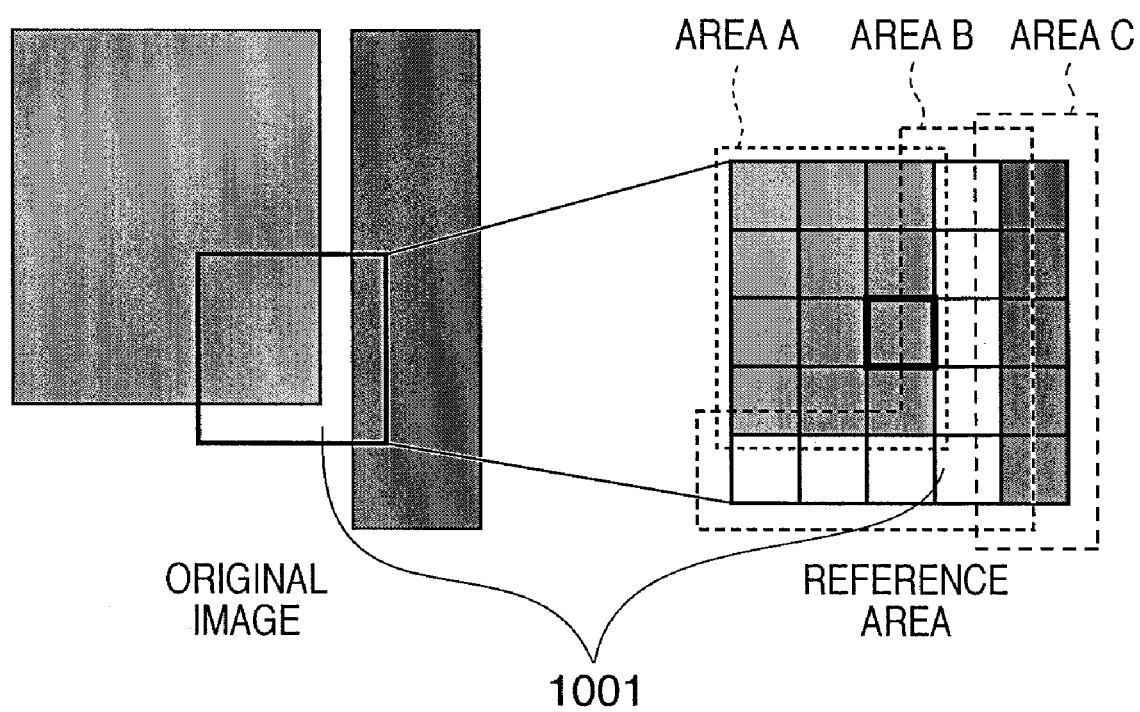
FIG. 10 is a view for explaining a problem of a conventional trapping process.
Figure 11A:
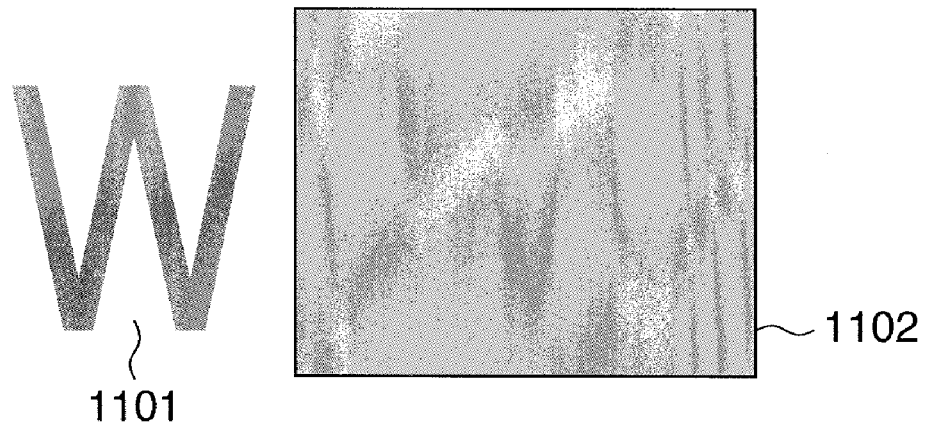
FIGS. 11A to 11C are views for explaining a problem of a trapping process of a graphic pattern including a character.
Figure 11B:
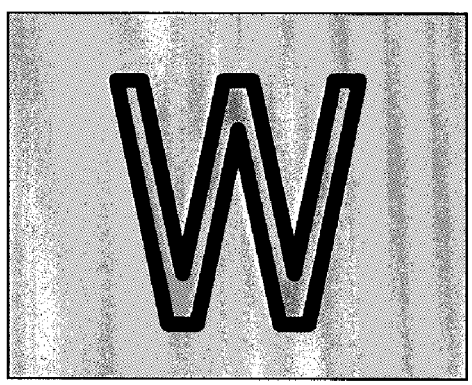
Figure 11C:
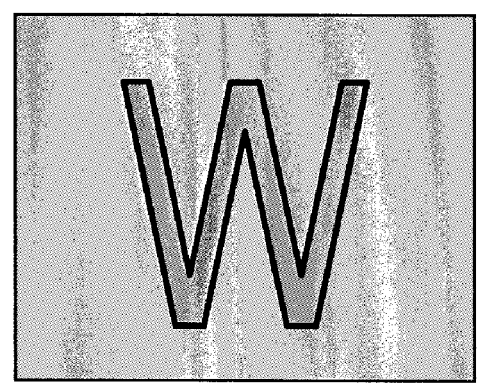

An example of the hardware configuration of the image forming apparatus 100 according to this embodiment will be described next with reference to FIG. 8. As shown in FIG. 8, the image reading unit 101 and image output unit 105 are integrated as a scanner unit 200 and printer unit 300. The scanner unit 200 has a document feeding unit 250. The document feeding unit 250 feeds document sheets onto a platen glass 211 one by one sequentially from the first page. Every time one document sheet is read, the scanner unit 200 discharges it from the platen glass 211 to a discharge tray.

When a document sheet is fed onto the platen glass 211, the scanner unit 200 turns on a lamp 212 and starts moving a movable unit 213. The movable unit 213 scans and reads the document on the platen glass 211 while moving. During the read scanning, light reflected from the document is guided to a CCD image sensor (to be referred to as a "CCD" hereinafter) 218 via mirrors 214, 215, and 216 and lens 217 so that the image on the document is formed on the imaging plane of the CCD 218. The CCD 218 converts the image formed on the imaging plane into an electrical signal. The electrical signal is subjected to a predetermined process and input to the image processing unit 102.

The printer unit 300 makes a light beam such as a laser beam modulated in accordance with the image data input from the image processing unit 102 strike a polygon mirror rotating at a uniform angular velocity, and irradiates a photosensitive drum 323 with the reflected scanning light.

An electrostatic latent image is formed on the photosensitive drum 323 serving as an image carrier irradiated with the laser beam. The electrostatic latent image is converted into visible toner images (developed images) by toners supplied from developers 324C, 324M, 324Y, and 324K serving as developing material containers which contain developing materials corresponding to a plurality of color components. More specifically, an image is formed by executing a series of electrophotographic processes, that is, transferring each toner image formed on the photosensitive drum 323 to a printing paper sheet serving as a printing material and collecting toner particles remaining on the photosensitive drum 323 after transfer. The developers 324C, 324M, 324Y, and 324K containing cyan (C) toner, magenta (M) toner, yellow (Y) toner, and black (K) toner, respectively, repeatedly execute the electrophotographic processes in turn while a printing paper sheet winds around at a predetermined position of a transfer unit 325 and rotates four revolutions. After the four revolutions, a full-color toner image having four color components is transferred to the printing paper sheet.

The printing paper sheet with the transferred toner image is sent to a pair of fixing rollers 326 (heating roller and pressurizing roller) via a conveyor belt. The pair of fixing rollers 326 apply heat and pressure to the printing paper sheet, thereby fixing the toner image to the printing paper sheet. The printing paper sheet which has passed through the pair of fixing rollers 326 is discharged to a discharge unit 330 by a pair of discharge rollers 327.

The discharge unit 330 includes a sheet processor capable of executing a post process such as sorting or stapling. In a double-sided print mode, the printing paper sheet conveyed to the pair of discharge rollers 327 is guided to a re-feeding path by a flapper by reversing the rotational directions of the pair of discharge rollers 327. The printing paper sheet guided to the re-feeding path 339 is re-fed to the point between the photosensitive drum 323 and the transfer unit 325 at the above-described timing so that a toner image is transferred to the reverse surface of the printing paper sheet.

The outline of the procedure of trapping process will be described. Then, the process procedure will be described in detail.

Figure 2:
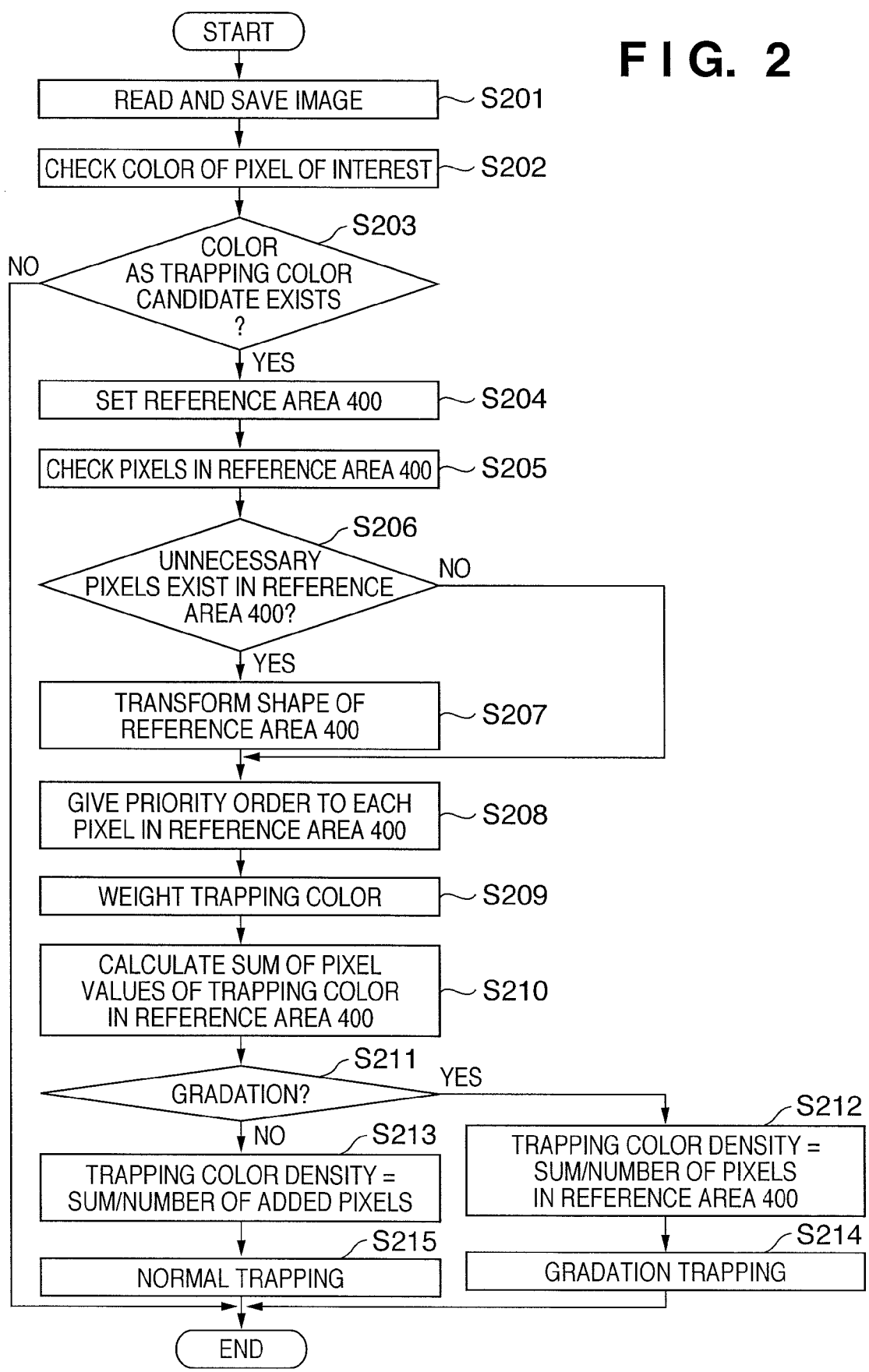
FIG. 2 is a flowchart illustrating an example of a trapping process according to the first embodiment of the present invention.

FIG. 2 is a flowchart for explaining a trapping process procedure of the image forming apparatus 100 according to the first embodiment of the present invention. The CPU 104 executes a corresponding process program stored in the storage unit 103, thereby implementing the process. Upon receiving a print start instruction, the image forming apparatus 100 reads and saves an image in step S201. In step S202, the read image is scanned. Pixels of interest are selected one by one, and the structure of the color of each pixel of interest is checked. If a color as a trapping color candidate is detected ("YES" in step S203), the process advances to step S204. In step S204, a trap width (n) is set, and a reference area including (2n+1)×(2n+1) pixels is set around the pixel of interest. In this embodiment, the trap width n=2. Hence, an area including 5×5 pixels is set as a reference area 400 around a pixel 401 of interest, as shown in FIG. 4A. If no color is detected as a trapping color candidate ("NO" in step S203), the process is ended without executing trapping.

In step S205, the pixels in the reference area are checked. If the pixels in the reference area include a pixel unnecessary for trapping ("YES" in step S206), the process advances to step S207. An unnecessary pixel indicates, for example, a white pixel (without toner) or a light color pixel not to be trapped. In step S207, the shape of the reference area is transformed to exclude the pixels determined to be unnecessary (the pixels not to be referred). This makes it possible to decide the trapping color without considering information unnecessary for trapping and execute trapping. Then, the process advances to step S208. If the reference area includes no pixel unnecessary for trapping ("NO" in step S206), the process directly advances to step S208.

In step S208, a priority order is given to each peripheral pixel around the pixel of interest in the reference area in accordance with the distance from the pixel of interest. In step S209, the trapping color is weighted in accordance with the priority order. If the weight is expressed by binary values "0" and "1", only a color of such a pixel that has the shortest distance from the pixel of interest and a different color than the color of the pixel of interest serves as a trapping color. This solves the problem of image quality degradation caused by mixture of a plurality of trapping colors.

In step S210, the sum of the pixel values of the trapping color in the reference area is calculated. In step S211, it is determined whether the type of trapping process is gradation trapping. This determination can be done based on, for example, user's selection. If the type is gradation trapping ("YES" in step S211), the process advances to step S212. If the type is not gradation trapping ("NO" in step S211), the process advances to step S213.

In step S212, the density of the trapping color of the pixel 401 of interest to be used for the gradation trapping process is calculated based on the occupation ratio of the trapping color in the reference area. In step S214, the pixel value of the pixel 401 of interest is corrected using the calculated trapping color density, and the gradation trapping process is executed. In step S213, the density of the trapping color of the pixel 401 of interest to be used for a normal trapping process is calculated based on the average value of the densities (pixel values) of the trapping color in the reference area. In step S215, the pixel value of the pixel 401 of interest is corrected using the calculated trapping color density, and the normal trapping process is executed.

The process of each step shown in FIG. 2 will be described below in more detail. The process of checking the color of the pixel of interest in step S202 will be described. The image forming apparatus 100 according to this embodiment has four colors (cyan, magenta, yellow, and black). In step S202, of the four colors, colors which are not included in the pixel of interest are selected as trapping color candidates, except black.

For example, when the pixel of interest contains only cyan, magenta and yellow are detected as trapping color candidates. If the density of cyan of the pixel of interest is low, the color is light, and the unprinted area is unnoticeable even when misregistration occurs. Hence, trapping is not executed. In this embodiment, for example, 256 tones are expressed by 8 bits. A density lower than 30 is determined as a low density so that trapping can be omitted.

The process of setting a reference area and transforming its shape in step S207 will be described next. In this process, of the pixels in the reference area, each white pixel or each light color (low density) pixel similar to white is defined as an unnecessary pixel and excluded from the reference area. An unnecessary pixel is defined as a pixel having a density lower than 30 in the 256 tones.

First, the presence/absence of an unnecessary pixel is determined in pixels which are located in line with the pixel of interest of the reference area 400 in the vertical and horizontal directions, as shown in FIG. 4B. The vertical direction is the y-axis direction in FIG. 4A. The horizontal direction is the x-axis direction. In this case, hatched pixels 402 and 403 in FIG. 4C are determined as unnecessary pixels.

When an unnecessary pixel exists, the shape of the reference area 400 is transformed in a direction closer to the pixel 401 of interest than the unnecessary pixel. FIG. 4D shows an example of the transformation result in which the horizontal and vertical pixel sequences including the pixels 402 and 403 are deleted except the unnecessary pixels, and a new reference area 400' is set.

Next, the presence/absence of an unnecessary pixel is determined in all horizontal components of the reference area. Consequently, unnecessary pixels 403 to 407 are detected, as shown in FIG. 4E. All the detected unnecessary pixels 402 to 407 are excluded from the reference area 400', and a reference area 400" is set, as shown in FIG. 4F.

A reference area including no unnecessary pixels can be generated in this way.

Figure 5:
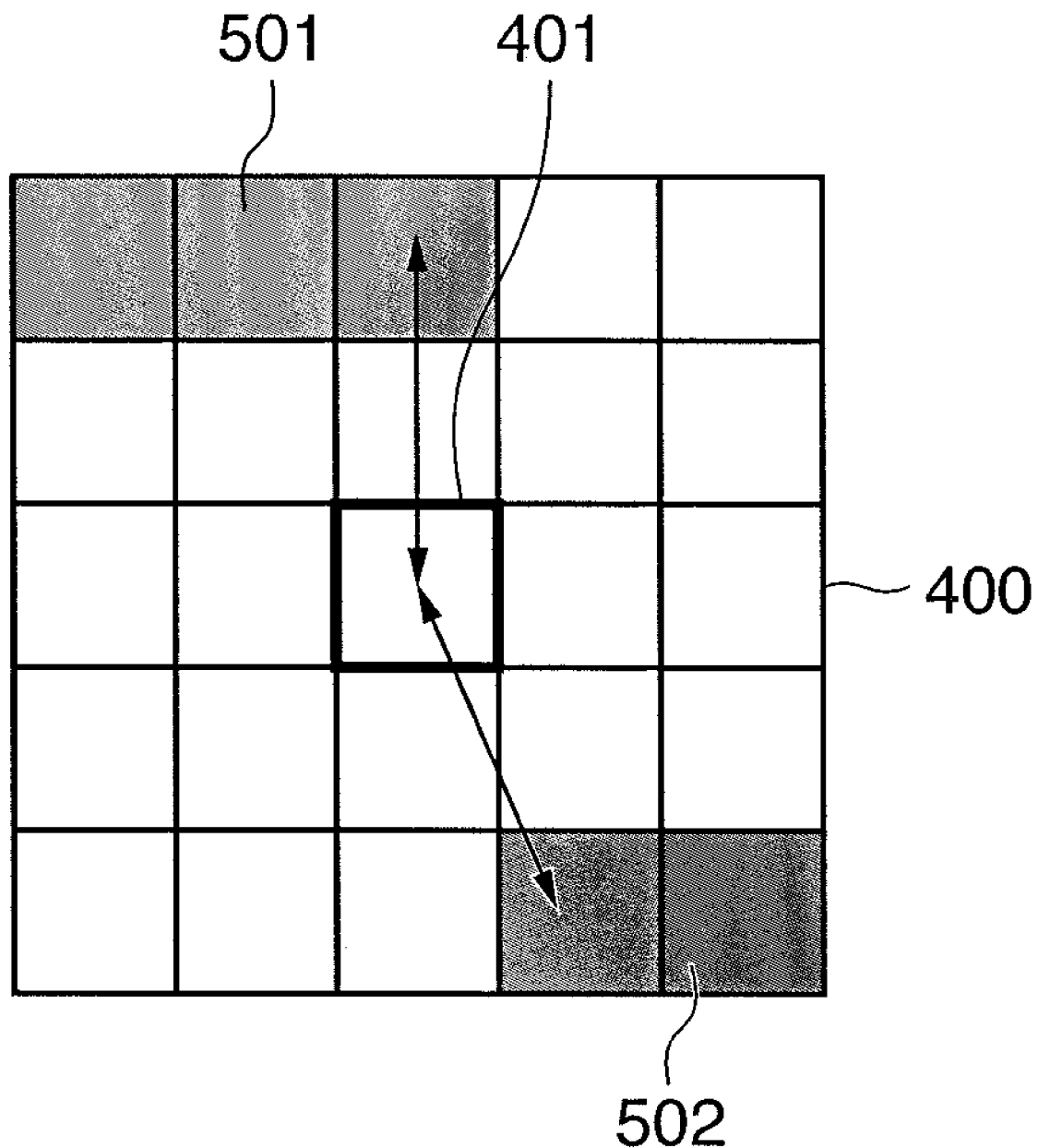
FIG. 5 is a view for explaining a trapping color weighting process according to the embodiment of the present invention.

The trapping color weighting process in steps S208 and S209 will be described next with reference to FIG. 5. In FIG. 5, the reference area 400 includes pixel groups 501 and 502 having colors as trapping color candidates. The trapping color candidates are colors that the pixel of interest does not have, as described above in association with step S202. In this embodiment, priority orders are given based on the distances between the pixel 401 of interest and the pixel groups 501 and 502. The distances are given by Distance between pixel group 501 and pixel 401 of interest=2×1+0×0=2

Distance between pixel group 502 and pixel 401 of interest=2×1+1×1=3

At this time, the priority order of the pixel group 501 is higher than that of the pixel group 502. When weighting is done using binary values "0" and "1", "1" is given to the pixel group 501, and "0" is given to the pixel group 502. Hence, the trapping color is the color of the pixel group 501.

The weighting method is not limited to the above. Weighting may be done in accordance with the calculated distance. In this case, "5/9" is given to the pixel group 501, and "4/9" is given to the pixel group 502. In this case, two trapping colors exist, and the weight calculation may be executed in calculating the density of pixel value.

The trapping color density calculation method in steps S210 to S213 will be described next. Trapping of this embodiment includes a gradation trapping process which changes the density in the trap width and a normal trapping process without gradation.

The density of the trapping color used in the normal trapping process is calculated by dividing the sum of pixel values having the trapping color in the reference area 400 by the number of pixels having the trapping color. On the other hand, the density of the trapping color used in the gradation trapping process is calculated by obtaining the occupation ratio of the trapping color in the reference area.

More specifically, the normal trapping is expressed by $$\text{trap\_color}_j = \left\{ \sum_{i=1}^{m} \frac{\text{trap\_color}_i \cdot w_j}{m} \right\} \quad (1)$$

where j: type of trapping color candidate
m: number of pixels having trapping color candidate j
wj: weight of trapping color candidate j
trap_color$_i$: ith pixel value or density of trapping color candidate j Wherein, the trap_color will be calculated for each color of the candidate.

The gradation trapping is expressed by $$\text{trap\_color}_j = \left\{ \sum_{i=1}^{m} \frac{\text{trap\_color}_i \cdot w_j}{m} \right\} \quad (2)$$

where n: total number of pixels in reference area

Equation (1) to implement the normal trapping will be described with reference to FIG. 6. For the sake of simplicity, a case wherein one trapping color candidate is present, and its weight is not taken into consideration will be explained.

As shown in FIG. 6A, the reference area 400 is set based on the pixel 401 of interest in an image 600 including a first color area 601 and a second color area 602. At this time, the reference area 400 includes first color pixels 603 and second color pixels 604, as shown in FIG. 6B. In particular, the pixels 604 form a column on the right side of the reference area 400. An edge is formed between the pixels 603 and 604.

At this time, the pixel value or density of the trapping color can be calculated by $$\text{trap\_color} = \sum_{i=1}^{m} \frac{\text{trap\_color}_i}{m} \quad (3)$$

Before trapping, since the number of pixels 604 having the trapping color is 5, $$\text{trap\_color} = \sum_{i=1}^{5} \frac{\text{trap\_color}_i}{5} \quad (4)$$

When trap_color$_i$=100 (for all i), equation (4) is rewritten to $$\text{trap\_color} = \sum_{i=1}^{5} \frac{\text{trap\_color}_i}{n} \quad (5)$$
$$= \frac{500}{5}$$
$$= 100$$

Note that the value of the trapping color may be multiplied by a trapping coefficient ($\leq 1$).

When the pixel 401 of interest moves to the right by one pixel, the pixels 604 form two columns on the right side of the reference area 400, as shown in FIG. 6C. An edge is formed between the pixels 603 and 604. Hence, the number of pixels: m=10, and $$\text{trap\_color} = \sum_{i=1}^{10} \frac{\text{trap\_color}_i}{m} \quad (6)$$
$$= \frac{1000}{10}$$
$$= 100$$

FIG. 6D shows a trapping result obtained in this way. An area 605 is obtained by correcting the color of the pixel of interest by using the trapping color obtained for the pixel of interest. The area 605 is located at the boundary between the first color area 601 and the second color area 602 and has a width corresponding to two pixels. That is, in the normal trapping, the density or pixel value of the trapping color is constant independently of the distance from the pixel 401 of interest or the number of pixels.

The gradation trapping process will be described next. When one trapping color candidate is present, equation (2) is rewritten to $$\text{trap\_color} = \sum_{i=1}^{m} \frac{\text{trap\_color}_i}{n} \quad (7)$$

In this case, the reference area includes 25 pixels, n=25. As in the normal trapping, when trap_color$_i$=100 (for all i), we obtain $$\text{trap\_color} = \sum_{i=1}^{5} \frac{\text{trap\_color}_i}{n} \quad (8)$$
$$= \frac{500}{25}$$
$$= 20$$

because the number of pixels: m=5 in FIG. 6B.

When the pixel of interest moves to the right by one pixel, as shown in FIG. 6C, the number of pixels: m=10, and $$\text{trap\_color} = \sum_{i=1}^{10} \frac{\text{trap\_color}_i}{n} \quad (9)$$
$$= \frac{1000}{25}$$
$$= 40$$

FIG. 6E shows a trapping result obtained in this way. An area 606 is obtained by correcting the color of the pixel of interest by using the trapping color obtained for the pixel of interest. The area 606 is also located at the boundary between the first color area 601 and the second color area 602 and has a width corresponding to two pixels. Note that in the area 606, a color close to the color of the second color area 602 is calculated as the trapping color for a pixel of interest close to the boundary. For a pixel of interest apart from the boundary, a color close to the color of the first color area 601 is calculated as the trapping color. Hence, a gradation is formed.

In step S211 in FIG. 2, the normal trapping or gradation trapping is decided in accordance with user's selection. However, the process may be switched automatically based on the type of object.

As described above, according to this embodiment, in setting a reference area for pixels to be processed, the trapping process can be executed after excluding white pixels and the like from the reference area. Hence, no white pixel area is filled by the trapping process. In addition, the trapping process can be executed by switching between trapping using gradation and trapping without gradation.

In the present embodiment, whether to start trapping for a pixel of interest is determined depending on the condition of each pixel in the reference area. It is therefore unnecessary to acquire the edge information of an object. Furthermore, it is possible to trap only a desired trapping color by giving a priority order to each pixel or color information in the reference area and selecting a trapping color based on the priority order. Trapping of gradation is also possible. No image quality degradation occurs even in a certain kind of object such as a gradation object.

Second Embodiment

The second embodiment of the present invention will be described next. When a large trap width is set for an image to be processed including a character or thin line, a part that has undergone trapping is noticeable relative to the character or thin line, and the appearance of the printed product becomes poor. To prevent this, in the second embodiment, if the pixel of interest is included in a character or thin line, the reference area is set such that the trap width becomes small. Additionally, to improve the appearance of the printed product, the reference area size is made changeable even in accordance with the brightness difference between a character and the background.

Figure 3:
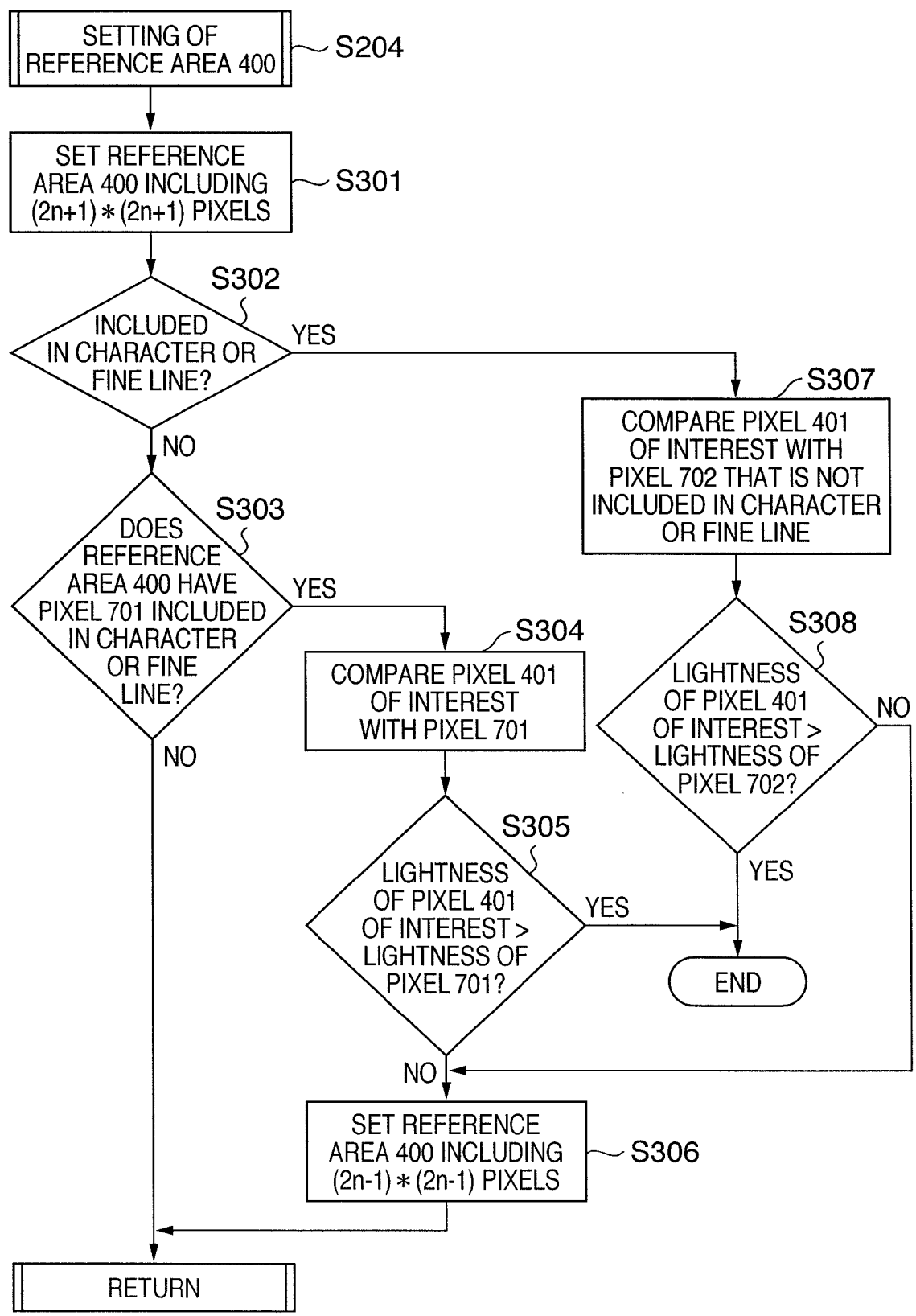
FIG. 3 is a flowchart illustrating an example of a process of setting a reference area 400 according to the second embodiment of the present invention.

FIG. 3 is a flowchart illustrating an example of a process of setting a reference area 400 by an image forming apparatus 100 according to the second embodiment of the present invention. This setting process is executed in place of step S204 in FIG. 2. The processes except step S204 in FIG. 2 are executed in the same way for trapping even in this embodiment. In calculating the sum of pixel values in step S210, of the trapping colors in the reference area 400, the sum of pixels brighter than a pixel 401 of interest is calculated. The thus obtained sum is used for trapping color density calculation in steps S212 and S213. The process in FIG. 3 will be described below in detail with reference to FIG. 7.

Figure 7A:
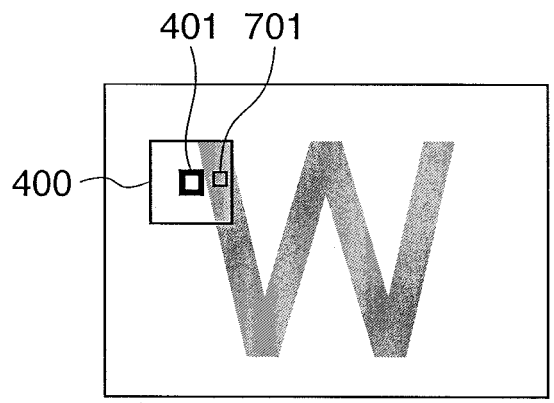
FIGS. 7A to 7F are views for explaining the process of setting the reference area 400 according to the second embodiment of the present invention.

In step S301, the reference area 400 including (2n+1)×(2n+1) pixels is set around the pixel 401 of interest (n is the trap width). In step S302, it is determined whether the pixel 401 of interest in the reference area 400 is included in a character or thin line. FIGS. 7A to 7F show an image to be processed including a character "W". FIG. 7A shows an example wherein a gray character "W" is placed on a white background. The pixel 401 of interest is located outside the character "W". Hence, the determination result in step S302 is "NO". In this case, the process advances to step S303 to determine whether a pixel 701 included in a character or thin line exists in the reference area 400.

Referring to FIG. 7A, the pixel 701 included in the character "W" exists ("YES" in step S303). The process advances to step S304 to compare the brightness of the pixel 401 of interest with that of the pixel 701 based on their pixel values. In FIG. 7A, since pixel 401 of interest >pixel 701, i.e., the pixel 401 of interest is brighter than the pixel 701 ("YES" in step S305), trapping is not executed.

Figure 7B:
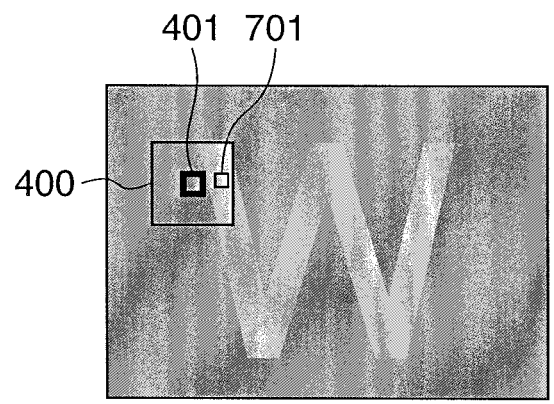
Figure 7C:
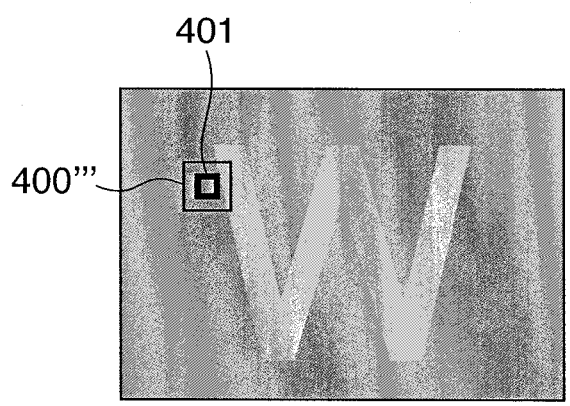

FIG. 7B shows an example wherein a light gray character "W" is placed on a dark gray background. When the brightness of the pixel 401 of interest is compared with that of the pixel 701 based on their pixel values, pixel 401 of interest <pixel 701, i.e., the pixel 701 is brighter than the pixel 401 of interest ("NO" in step S305). The process advances to step S306 to set a smaller reference area (400'), as shown in FIG. 7C, and the trapping process is executed. The reference area 400' set at this time includes (2n−1)×(2n−1) pixels. In this case, the trap width corresponds to 1.

If it is determined in step S303 that the pixel 701 included in a character or thin line does not exist in the reference area 400 ("NO" in step S303), the process advances to step S205 next to step S204. In this case, the reference area 400 has the size set in step S301.

If it is determined in step S302 that the pixel 401 of interest is included in a character or thin line ("YES" in step S302), the process advances to step S307. In step S307, the brightness of the pixel 401 of interest is compared with that of a pixel 702 that is not included in a character or thin line based on their pixel values.

Figure 7D:
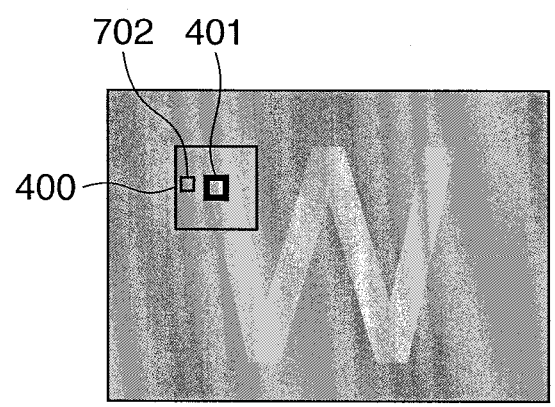

For example, FIG. 7D shows an example wherein a light gray character "W" is placed on a dark gray background. The pixel 401 of interest is included in the character "W" ("YES" in step S302) When the brightness of the pixel 401 of interest is compared with that of the pixel 702 that is not included in the character based on their pixel values, pixel 401 of interest >pixel 702, i.e., the pixel 401 of interest is brighter than the pixel 702 ("YES" in step S308). In this case, trapping is not executed.

Figure 7E:
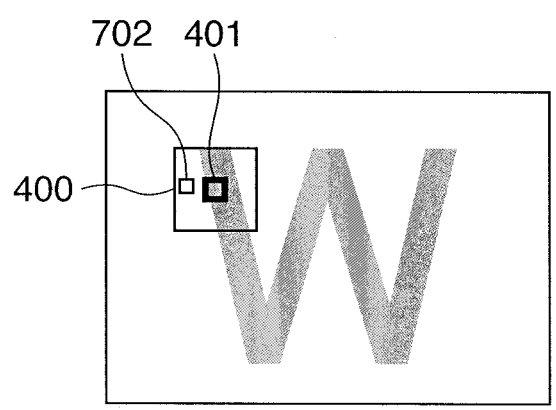
Figure 7F:
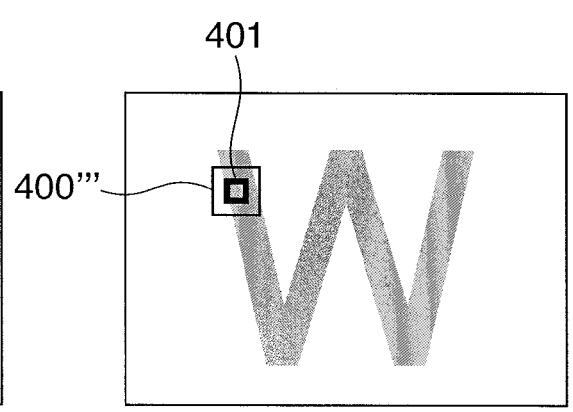

FIG. 7E shows an example wherein a gray character "W" is placed on a white background. The pixel 401 of interest is included in the character "W" ("YES" in step S302). When the brightness of the pixel 401 of interest is compared with that of the pixel 702 that is not included in the character "W" based on their pixel values, pixel 401 of interest <pixel 702, i.e., the pixel 702 is brighter than the pixel 401 of interest ("NO" in step S308). In this case, the process advances to step S306 to make the reference area 400 smaller (400″), as shown in FIG. 7F, and the trapping process is executed. The reference area 400″ set at this time includes (2n−1)×(2n−1) pixels.

According to the above-described process, when a pixel of interest is included in a character or thin line a small reference area can be set such that the trap width becomes small. This prevents trapping of an undesirable part of a character or thin line.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-327628, filed Dec. 4, 2006, which is hereby incorporated by reference herein in its entirety.

What is claimed is:

1. An image forming apparatus for forming a color image by using a plurality of color component materials, comprising:
    an area setting unit configured to set a reference area around a pixel of interest in an image to be processed;
    a determination unit configured to determine whether a pixel not to be referred exists in the reference area;
    a transformation unit configured to, if the pixel not to be referred exists, transform the shape of the reference area based on the pixel not to be referred;
    a decision unit configured to specify at least a first group and a second group of peripheral pixels, each of which has a color component that corresponds to one of a plurality of color component materials and that is not included in the pixel of interest, around the pixel of interest included in the reference area with the transformed shape, and configured to decide a trapping color for the pixel of interest based on a single peripheral pixel determined by checking distances from the pixel of interest to the first and second groups of peripheral pixels;
    a density calculation unit configured to calculate a density of the trapping color based on at least the first or second groups of peripheral pixels;
    a correction unit configured to correct a pixel value of the pixel of interest using the trapping color having the calculated density in the image to be processed; and
    an image forming unit configured to form an image having pixels corrected by the correction unit,
    wherein the area setting unit sets a first reference area around the pixel of interest, and
    wherein, in a first case where the pixel of interest is included in a character or thin line, and in a second case where the pixel of interest is not included in the character or thin line but the first reference area includes the character or thin line, the area setting unit determines whether or not to change the reference area from the first reference area to a second reference area smaller than the first reference area for making a trap width smaller, and changes the reference area to the second reference area based on the determination results.

2. The apparatus according to claim 1, wherein the pixel not to be referred is one of a white pixel and a pixel having a lower density than predetermined values.

3. The apparatus according to claim 1, wherein when a plurality of color components are not included in the pixel of interest, the decision unit decides the trapping color by giving a priority order.

4. The apparatus according to claim 1, wherein the density calculation unit is further configured to calculate different densities in accordance with a distance between the pixel of interest and a peripheral pixel having a color component that is not included in the pixel of interest; and
    calculate equal densities independently of the distance between the pixel of interest and the peripheral pixel.

5. The apparatus according to claim 4, wherein the density calculation unit calculates the different, when the correction unit corrects the pixel value of the pixel of interest to gradually change from one color to another, and
    calculates the equal densities, when the correction unit corrects the pixel value of the pixel of interest without gradually changing from one color to another.

6. The apparatus according to claim 4, wherein
    each of the different densities is calculated based on a sum of the densities of either the first or second group of peripheral pixels that includes the single peripheral pixel and the number of pixels included in the reference area, and
    each of the equal densities is calculated based on the sum of the densities of either the first or second group of peripheral pixels that includes the single peripheral pixel and the number of such peripheral pixels.

7. The apparatus according to claim 1, wherein when the pixel of interest is not included in a character or thin line in the image to be processed, the area setting unit compares a first pixel included in the character or thin line among pixels included in a first area including a first number of pixels around the pixel of interest, with the pixel of interest, and if the first pixel has a brighter pixel value than the pixel of interest, sets the reference area as an area including a second number of pixels smaller than the first number of pixels.

8. The apparatus according to claim 1, wherein when the pixel of interest is included in a character or thin line in the image to be processed, the area setting unit compares a second pixel not included in the character or thin line among pixels included in a first area including a first number of pixels around the pixel of interest, with the pixel of interest, and if the second pixel has a brighter pixel value than the pixel of interest, sets the reference area as an area including a second number of pixels smaller than the first number of pixels.

9. The apparatus according to claim 1, the image forming unit comprising:
    developing material containers configured to contain developing materials corresponding to a plurality of color components;

an image carrier configured to carry a latent image corresponding to the image to be processed; and a transfer unit configured to execute image forming by transferring, to a printing material, a developed image obtained by developing the latent image by the developing materials in the developing material containers.

10. A control method of an image forming apparatus for forming a color image by using a plurality of color component materials, comprising:

using a processor to perform the steps of:

setting a reference area around a pixel of interest in an image to be processed;

determining whether a pixel not to be referred exists in the reference area;

if the pixel not to be referred exists, transforming the shape of the reference area based on the pixel not to be referred;

specifying at least a first group and a second group of peripheral pixels, each of which has a color component that corresponds to one of a plurality of color component materials and that is not included in the pixel of interest, around the pixel of interest included in the reference area with the transformed shape, and deciding a trapping color for the pixel of interest based on a single peripheral pixel determined by checking distances from the pixel of interest to the first and second groups of peripheral pixels;

calculating a density of the trapping color based on at least the first or second group of peripheral pixels;

correcting a pixel value of the pixel of interest using the trapping color having the calculated density in the image to be processed; and forming an image having pixels corrected in the correcting step, wherein setting the reference area includes setting a first reference area around the pixel of interest, and wherein, in a first case where the pixel of interest is included in a character or thin line, and in a second case where the pixel of interest is not included in the character or thin line but the first reference area includes the character or thin line, it is determined whether or not to change the reference area from the first reference area to a second reference area smaller than the first reference area for making a trap width smaller, and the reference area is changed to the second reference area based on the determination results.

11. The method according to claim 10, wherein the pixel not to be referred is one of a white pixel and a pixel having a lower density than predetermined values.

12. The method according to claim 10, wherein when a plurality of color components are not included in the pixel of interest, in the specifying and deciding step, the trapping color is decided by giving a priority order.

13. The method according to claim 10, the density calculating step comprising the steps of:

executing a first calculation to calculate different densities in accordance with a distance between the pixel of interest and a peripheral pixel having a color component that is not included in the pixel of interest; and executing a second calculation to calculate equal densities independently of the distance between the pixel of interest and the peripheral pixel.

14. The method according to claim 13, wherein in the density calculating step, the density is calculated in the first calculation when the pixel value of the pixel of interest is corrected in the correcting step to gradually change from one color to another, and the density is calculated in the second calculation when the pixel value of the pixel of interest is corrected in the correcting step without gradually changing from one color to another.

15. The method according to claim 13, wherein in the first calculating step, each of the different densities is calculated based on a sum of the densities of either the first or second group of peripheral pixels that includes the single peripheral pixel and the number of pixels included in the reference area, and in the second calculating step, each of the equal densities is calculated based on the sum of the densities of either the first or second group of peripheral pixels that includes the single peripheral pixel and the number of such peripheral pixels.

16. The method according to claim 10, wherein in the area setting step, when the pixel of interest is not included in a character or thin line in the image to be processed, a first pixel included in the character or thin line among pixels included in a first area including a first number of pixels around the pixel of interest, is compared with the pixel of interest, and if the first pixel has a brighter pixel value than the pixel of interest, the reference area is set as an area including a second number of pixels smaller than the first number of pixels.

17. The method according to claim 10, wherein in the area setting step, when the pixel of interest is included in a character or thin line in the image to be processed, a second pixel not included in the character or thin line among pixels included in a first area including a first number of pixels around the pixel of interest, is compared with the pixel of interest, and if the second pixel has a brighter pixel value than the pixel of interest, the reference area is set as an area including a second number of pixels smaller than the first number of pixels.

18. The method according to claim 10, the image forming apparatus comprising:

developing material containers configured to contain developing materials corresponding to a plurality of color components;

an image carrier configured to carry a latent image corresponding to the image to be processed; and a transfer unit configured to execute image forming by transferring, to a printing material, a developed image obtained by developing the latent image by the developing materials in the developing material containers.

19. A control method of an image forming apparatus for forming a color image by using a plurality of color component materials, comprising:

using a processor to perform the steps of:

setting a reference area around a pixel of interest in an image to be processed;

determining whether a pixel not to be referred exists in the reference area;

if the pixel not to be referred exists, transforming the shape of the reference area based on the pixel not to be referred;

specifying at least a first group and a second group of peripheral pixels, each of which has a color component that corresponds to one of a plurality of color component materials and that is not included in the pixel of interest, around the pixel of interest included in the reference area with the transformed shape, and deciding a trapping color for the pixel of interest based on a single peripheral pixel determined by checking distances from the pixel of interest to the first and second groups of peripheral pixels;

correcting a pixel value of the pixel of interest using the trapping color in the image to be processed, and forming an image having pixels corrected in the correcting step, wherein setting the reference area includes setting a first reference area around the pixel of interest, and wherein, in a first case where the pixel of interest is included in a character or thin line, and in a second case where the pixel of interest is not included in the character or thin line but the first reference area includes the character or thin line, it is determined whether or not to change the reference area from the first reference area to a second reference area smaller than the first reference area for making a trap width smaller, and the reference area is changed to the second reference area based on the determination results.

20. A non-transitory computer-readable storage medium storing a computer program which causes a computer to execute a control method of an image forming apparatus for forming a color image by using a plurality of color component materials, the control method comprising the steps of setting a reference area around a pixel of interest in an image to be processed;

determining whether a pixel not to be referred exists in the reference area;

if the pixel not to be referred exists, transforming the shape of the reference area based on the pixel not to be referred;

specifying at least a first group and a second group of peripheral pixels, each of which has a color component that corresponds to one of a plurality of color component materials and that is not included in the pixel of interest, around the pixel of interest included in the reference area with the transformed shape, and deciding a trapping color for the pixel of interest based on a single peripheral pixel determined by checking distances from the pixel of interest to the first and second groups of peripheral pixels;

calculating a density of the trapping color based on at least the first or second group of peripheral pixels;

correcting a pixel value of the pixel of interest using the trapping color having the calculated density in the image to be processed; and forming an image having pixels corrected in the correcting step, wherein setting the reference area includes setting a first reference area around the pixel of interest, and wherein, in a first case where the pixel of interest is included in a character or thin line, and in a second case where the pixel of interest is not included in the character or thin line but the first reference area includes the character or thin line, it is determined whether or not to change the reference area from the first reference area to a second reference area smaller than the first reference area for making a trap width smaller, and the reference area is changed to the second reference area based on the determination results.

* * * * *